(12) United States Patent
Liu et al.

(10) Patent No.: US 8,162,801 B2
(45) Date of Patent: Apr. 24, 2012

(54) GEAR ENGAGEMENT CONTROL SYSTEM AND METHOD

(75) Inventors: Sharon Liu, Ann Arbor, MI (US);
Henry A. Hainer, Ray, MI (US);
Michael Simon, Plymouth, MI (US);
Joshua D Cowgill, Hartland, MI (US);
Douglas R. Verner, Sterling Heights, MI (US)

(73) Assignee: GM Global Technology Operations LLC

( * ) Notice: Subject to any disclaimer, the term of this patent is extended or adjusted under 35 U.S.C. 154(b) by 250 days.

(21) Appl. No.: 12/709,807

(22) Filed: Feb. 22, 2010

(65) Prior Publication Data

US 2011/0207579 A1    Aug. 25, 2011

(51) Int. Cl.
*B60W 10/06* (2006.01)
*B60W 10/18* (2006.01)

(52) U.S. Cl. .................... 477/185; 477/203; 123/179.4; 74/7 A

(58) Field of Classification Search .................... 74/7 A, 74/339, 402, 403; 123/179.4; 477/185, 203
See application file for complete search history.

(56) References Cited

U.S. PATENT DOCUMENTS

| | | | | |
|---|---|---|---|---|
| 1,277,652 | A * | 9/1918 | Seymour | 74/462 |
| 1,491,481 | A * | 4/1924 | Huetter | 74/401 |
| 6,702,718 | B2 * | 3/2004 | Tani et al. | 477/203 |
| 2011/0056450 | A1 * | 3/2011 | Notani | 123/179.4 |
| 2011/0132308 | A1 * | 6/2011 | Liu et al. | 123/179.4 |
| 2011/0239974 | A1 * | 10/2011 | Shoda et al. | 123/179.4 |

* cited by examiner

*Primary Examiner* — Sherry Estremsky

(57) ABSTRACT

A control system includes an auto-stop module, an auto-start module, and a starter module. The auto-stop module stops an engine when a brake pedal position is greater than a threshold position and a transmission is in a drive gear. The auto-start module starts the engine when the brake pedal position is less than a minimum position and the engine stop is initiated. When the engine start is initiated and an engine speed is greater than zero, the starter module engages a pinion gear of a starter with a ring gear of an engine by reciprocally actuating the pinion gear N times between a retracted position and an extended position, wherein N is an integer greater than two.

20 Claims, 3 Drawing Sheets

GEAR ENGAGEMENT CONTROL SYSTEM AND METHOD

FIELD

The present disclosure relates to a gear engagement control system and method for engaging gears rotating at different speeds.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Hybrid propulsion systems typically include a first torque generator, such as an internal combustion engine (ICE), and a second torque generator, such as an electric machine (EM). Each can provide torque to a driveline to propel a vehicle. Various configurations of hybrid powertrains can be used, including a strong hybrid powertrain, a mild hybrid powertrain and/or other hybrid types. In a strong hybrid powertrain, the EM can drive the driveline directly, without transferring torque through a component of the ICE.

In a mild hybrid configuration, the EM is coupled with the ICE, such as through the front end accessory drive. Torque generated by the EM is transferred to the driveline through the ICE. An exemplary mild hybrid powertrain includes a belt alternator starter (BAS) system. In the BAS system, the EM is coupled to the ICE via a traditional belt and pulley configuration, which drives other accessory components including, but not limited to, pumps and compressors.

When coupled together, these technologies are capable of providing further fuel savings. One efficiency improvement included in hybrid propulsion systems is the engine start-stop function. During periods when a conventional engine would be idling, the hybrid system stops the engine to increase fuel savings. When the system senses that the driver is about to request the vehicle to accelerate, the hybrid system restarts the engine and may assist the engine in the subsequent vehicle acceleration.

SUMMARY

A control system includes an auto-stop module, an auto-start module, and a starter module. The auto-stop module stops an engine when a brake pedal position is greater than a threshold position and a transmission is in a drive gear. The auto-start module starts the engine when the brake pedal position is less than a minimum position and the engine stop is initiated. When the engine start is initiated and an engine speed is greater than zero, the starter module engages a pinion gear of a starter with a ring gear of an engine by reciprocally actuating the pinion gear N times between a retracted position and an extended position, wherein N is an integer greater than two.

A method includes initiating rotation of a first gear and engaging the first gear with a second gear rotating at a different speed by reciprocally actuating the first gear N times between a retracted position and an extended position, wherein N is an integer greater than two.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
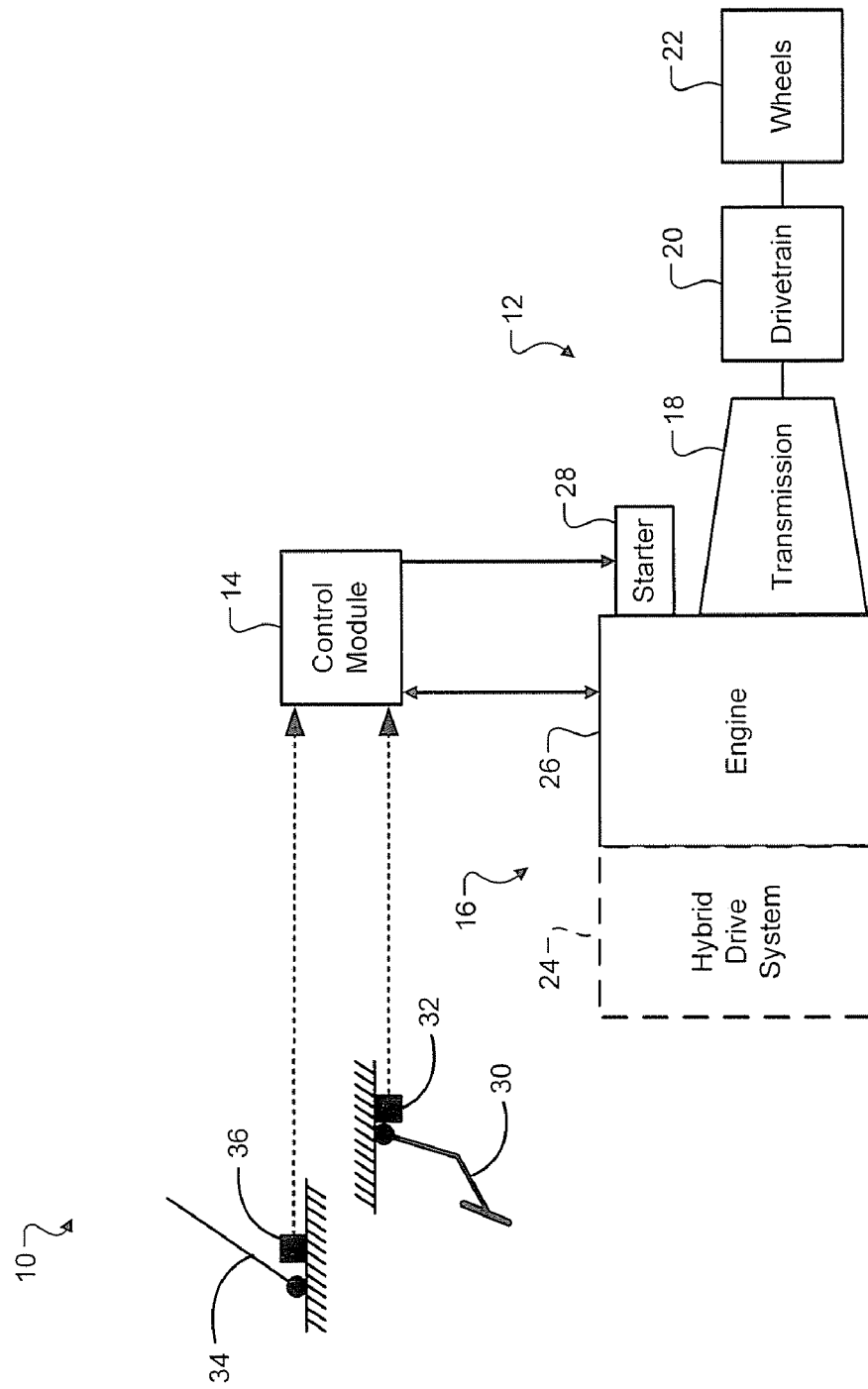
FIG. 1 is a functional block diagram illustrating an exemplary vehicle system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

As discussed above, a hybrid propulsion system may include an engine stop-start function that stops an engine during conventional engine idle periods and restarts the engine when a driver is about to request acceleration. A gear engagement control system and method of the present disclosure enables both hybrid and non-hybrid propulsion systems to restart a moving engine using a conventional starter. A pinion gear of the starter is actuated between retracted and extended positions in a quick dithering or pulsed sequence. At the same time, rotation of the pinion gear may be initiated by activating a motor in the starter. Actuating the pinion gear when initiating rotation of the pinion gear simulates spring loading the pinion gear to prevent gear teeth collision.

Conventional propulsion systems crank an engine using a starter by actuating a pinion gear of the starter from a retracted position to an extended position and then maintaining the pinion gear in the extended position. In such systems, mechanical modifications to the starter may be necessary in order to avoid gear teeth collisions. These modifications may include beveling the gear teeth to provide angled surfaces for meshing teeth to readily slide into engagement, spring loading the pinion gear along a line of centers between the pinion gear and a ring gear of the engine, and clutching the pinion gear and ring gears to control and reduce the relative velocities of the gears.

The gear engagement techniques of the present disclosure enable restarting an engine using a conventional starter without costly modifications. More generally, these techniques enable engagement between any electronically-actuated gear and another gear rotating at a different speed.

Referring now to FIG. 1, an exemplary vehicle system 10 according to the present disclosure is shown. The vehicle system 10 includes a powertrain 12 controlled by a control module 14. The powertrain 12 includes a powerplant 16 that produces drive torque that is transmitted through a transmission 18 to a drivetrain 20 to drive wheels 22 of the vehicle. The powerplant 16 may be a hybrid powerplant that includes a hybrid drive system 24 coupled with an internal combustion engine 26 that is engaged with a starter 28. As such, drive torque may be supplied by the hybrid drive system 24, the engine 26, or a combination thereof. Alternatively, the powerplant 16 may not include the hybrid drive system 24 and drive torque may be supplied by the engine 26.

A starter 28 may be selectively engaged with the engine 26. The starter 28 is operable to supply torque to crank and thereby start the engine 26. One or more components of the starter 28 may be disengaged from the engine 26 while the engine 26 is running.

The control module 14 controls operation of various components of the powertrain 12 including, but not limited to, the powerplant 16 and the transmission 18. The control module 14 may control the operation based on inputs received from various sensors, as discussed herein. The control module 14 may control the drive torque produced by the powerplant 16 based on sensors that monitor one or more driver interface devices.

The vehicle operator may manipulate a brake pedal 30 to regulate vehicle braking. In turn, a brake position sensor 32 may generate a brake pedal position signal that is communicated to the control module 14. The brake pedal position signal may indicate a brake pedal position that increases as braking increases. The control module 14 may generate a brake control signal based on the brake pedal position signal. A brake system (not shown) may adjust braking based on the brake control signal to regulate vehicle speed.

The vehicle operator may manipulate a gear lever 34 to select a gear (not shown) of the transmission 18. In turn, a gear selection sensor 36 may generate a gear selection signal that is communicated to the control module 14. The gear selection signal may indicate a gear (e.g., park, reverse, neutral, drive, low, high) of the transmission 18 that is selected by the vehicle operator. The control module 14 may generate a gear control signal based on the gear selection signal. The transmission 18 adjusts the gear selected based on the gear control signal to regulate transmission gear shifting.

The control module 14 may implement the gear engagement techniques of the present disclosure. The starter 28 may be a conventional starter and the control module 14 may execute an engine stop-start function. The control module 14 may stop the engine 26 during conventional engine idle periods and restart the engine 26 when a driver is about to request acceleration. When restarting the engine 26 at engine speeds greater than zero, the control module 14 may engage a pinion gear of the starter 28 with a ring gear of the engine 26 by actuating the pinion gear between retracted and extended positions in a quick dithering or pulsed sequence. Actuating the pinion gear in this manner causes the pinion gear to behave as though the pinion gear were spring-loaded along a line of centers between the pinion gear and the ring gear.

Figure 2:
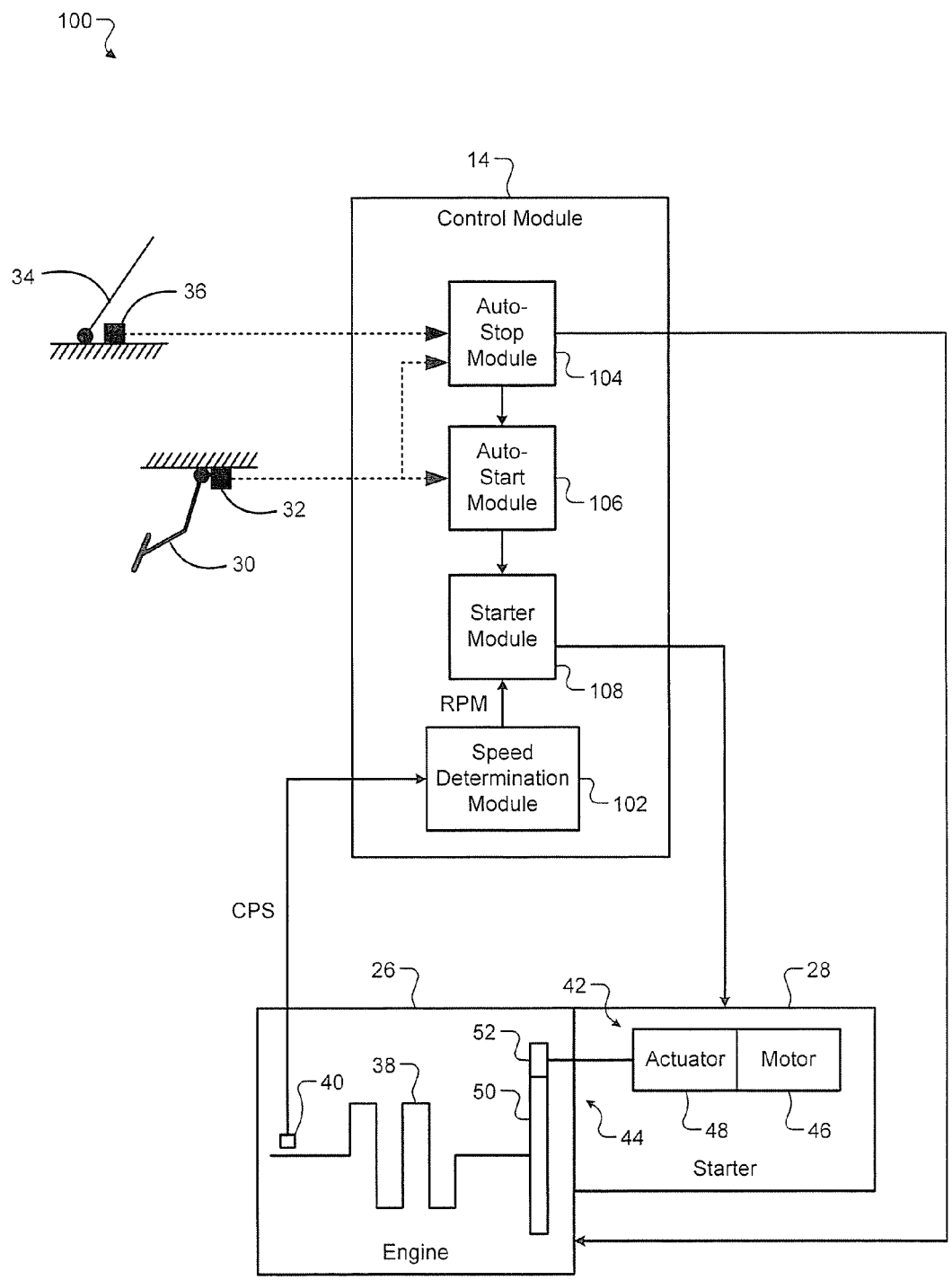
FIG. 2 is a functional block diagram illustrating an exemplary engine control system according to the present disclosure.

Referring now to FIG. 2, the engine 26 may be one of several configurations including, but not limited to, the reciprocating type as discussed herein. The engine 26 produces drive torque by combusting a mixture of air and fuel in cylinders (not shown). Air may be drawn into the engine 26 through a throttle (not shown) that controls the amount of air entering the engine 26. Fuel may be supplied by a fuel system (not shown) that controls the amount of fuel supplied to the cylinders. The air-fuel mixture may be ignited by a spark ignition system (not shown), providing combustion that supplies energy to the cylinders.

Pistons (not shown) may reciprocate within the cylinders in response to the combustion and transmit drive torque to a crankshaft 38. The crankshaft 38 rotates in response to the drive torque and may transmit the drive torque to the transmission 18 of FIG. 1. A crankshaft position sensor (CPS) 40 may sense rotation of the crankshaft 38 and generate a crankshaft position sensor signal in response to the rotation of the crankshaft 38.

The starter 28 may include a motor/actuator assembly 42 connected to the crankshaft 38 by a gear train 44. The motor/actuator assembly 42 may include a motor 46 and an actuator 48. The motor 46 may supply torque that is transmitted to the crankshaft 38 via the gear train 44. The actuator 48 may control whether the torque generated by the motor 46 is transmitted to the crankshaft 38. In various configurations, discussed in further detail below, the actuator 48 may be operable to selectively couple the motor 46 and one or more components of the gear train 44 with the crankshaft 38.

The gear train 44 may include a driven member 50 and a driving member 52. The driven member 50 may be fixed to rotate with the crankshaft 38 and may be rotatably driven by the driving member 52. The driving member 52 may be coupled to the motor/actuator assembly 42 and may be configured to be engaged and disengaged with the driven member 50 at engine speeds of zero and above. In this regard, the driven member 50 may be a ring gear of the engine 26 and the driving member 52 may be a pinion gear of the starter 28.

When engaged with the driven member 50, the driving member 52 may transmit the torque supplied by the motor/actuator assembly 42 to the driven member 50. The actuator 48 may provide for the engagement and disengagement between the driven and driving members 50, 52. The motor/actuator assembly 42 may be activated to provide for the engagement of the driven and driving members 50, 52 and may be deactivated to provide for the disengagement of the driven and driving members 50, 52.

The motor/actuator assembly 42 and the gear train 44 may be arranged in ring and gear configuration. In this configuration, the driven member 50 may include a flywheel of the engine 26 having a ring gear and the driving member 52 may include a pinion gear of the starter 28 that meshes with the ring gear. The pinion gear may be a retractable pinion gear that meshes with the ring gear when extended and disengages from the ring gear when retracted. In such an arrangement, the actuator 48 of the motor/actuator assembly 42 may control the extension and retraction of the pinion gear.

Referring still to FIG. 2, an exemplary implementation of the control module 14 in an exemplary engine control system 100 for the engine 26 is shown. The control module 14 may include a speed determination module 102, an auto-stop module 104, an auto-start module 106, and a starter module 108. The speed determination module 102 determines a rotational speed (RPM) of the engine 26. The speed determination module 102 may determine the engine RPM based on the signal generated by a crankshaft position sensor 40.

The auto-stop module 104 may receive the brake pedal position signal from the brake position sensor 32 and may receive the gear selection signal from the gear selection sensor 36. The auto-stop module 104 generates an auto-stop signal to automatically stop the engine 26 (i.e., stop the engine 26 without a manual engine shutdown) during conventional engine idle periods. The auto-stop module 104 may generate the auto-stop signal based on the brake pedal position signal and the gear selection signal. For example, the auto-stop module 104 may generate the auto-stop signal when the brake pedal position signal indicates that the brake pedal position is greater than a threshold position and the gear selection signal indicates that the selected gear is drive. In addition, the auto-stop signal may be generated when a vehicle speed is zero.

The auto-start module 106 may receive the brake pedal position signal from the brake position sensor 32 and may receive the auto-stop signal from the auto-stop module 104. The auto-start module 106 generates an auto-start signal to automatically start the engine 26 (i.e., start the engine 26 without a manual engine startup) when a driver is about to request acceleration.

The auto-start module 106 may generate the auto-start signal based on the brake pedal position signal and the auto-stop signal. For example, the auto-start module 106 may generate the auto-start signal when the brake pedal position signal indicates that the brake pedal position is less than a minimum position and the auto-stop signal indicates that an auto-stop is in progress. Alternatively, the auto-start module 106 may determine that an auto-stop is in progress based on the engine RPM determined by the speed determination module 102. For example, the auto-start module 106 may determine that an auto-stop is in progress when the engine RPM is less than a predetermined engine run speed and the engine RPM is decreasing.

The starter module 108 may receive the engine RPM from the speed determination module 102 and may receive the auto-start signal from the auto-start module 106. The starter module 108 generates a starter activation signal that activates the starter 28 to crank and thereby start the engine 26. The starter module 108 may generate the starter activation signal based on the engine RPM and the auto-start signal. For example, the starter module 108 may generate the starter activation signal when the engine RPM is greater than zero and the auto-start signal indicates that an auto-start has been initiated. In addition, the starter module 108 may generate the starter activation signal when the engine RPM is less than a maximum RPM. The maximum RPM may be predetermined (e.g., 400 RPM) such that the starter 28 is activated at low engine speeds to prevent damage to the driven and driving members 50, 52.

The starter activation signal may include a motor activation signal that initiates rotation of the motor 46 and an actuator activation signal that initiates actuation of the actuator 48. The actuator activation signal may be varied to extend and retract the driving member 52. For example, 12 and 0 volt signals may respectively extend and retract the driving member 52. Rotation of the motor 46 may be initiated at the same time that actuation of the actuator 48 is initiated. Due to inertia, a starter motor response is typically almost one order of magnitude slower than a starter pinion response. Thus, initiating the motor 46 at the same time as initiating the actuator 48 may cause the driven and driving members 50, 52 to engage before the motor 46 begins to crank the engine 26.

The starter module 108 may vary the actuator activation signal to extend and retract the driving member 52 between a retracted position and an extended position. The extended position is a position in which the diving member 52 may engage the driven member 50, and the retracted position is a position in which the diving member 52 is disengaged from the driven member 50. The starter module 108 may actuate the driving member 52 from the retracted position to the extended position, from the extended position to the retracted position, and from the retracted position to the extended position.

Alternatively, the starter module 108 may actuate the driving member 52 between the retracted and extended positions until the driven and driving members 50, 52 are engaged. The starter module 108 may determine that the driven and driving members 50, 52 are engaged based on an actuation position sensor (not shown) that detects a position of the driving member 52.

Whether the actuator activation signal actuates the driving member in a predetermined extended-retracted-extended sequence or in a retracted-extended sequence determined by engagement of the driven and driving members 50, 52, thereafter the actuator activation signal may activate the starter 28 in a conventional continuous manner to crank and thereby start the engine 26. The starter module 108 may stop generating the starter activation signal when the engine 26 is running. The starter module 108 may determine that the engine 26 is running when the engine RPM is greater than the predetermined engine run speed and the engine RPM is increasing.

The starter activation signal may be a single activation signal that initiates rotation of the motor 46 and initiates actuation of the actuator 48. The single activation signal may rotate the motor 46 and actuate the actuator 48 using either the predetermined extended-retracted-extended sequence or the retracted-extended sequence determined by engagement of the driven and driving members 50, 52. Thereafter, the single activation signal may activate the starter 28 in a conventional continuous manner to crank and thereby start the engine 26. The starter module 108 may stop generating the starter activation signal when the engine 26 is running.

The actuator/single activation signals may actuate the actuator 48 between the retracted and extended positions at an actuation frequency. The actuation frequency may be predetermined to be different than a rotational frequency of the driven and driving members 50, 52 when engaged. For example, the actuation frequency may be higher than the rotational frequency.

Figure 3:
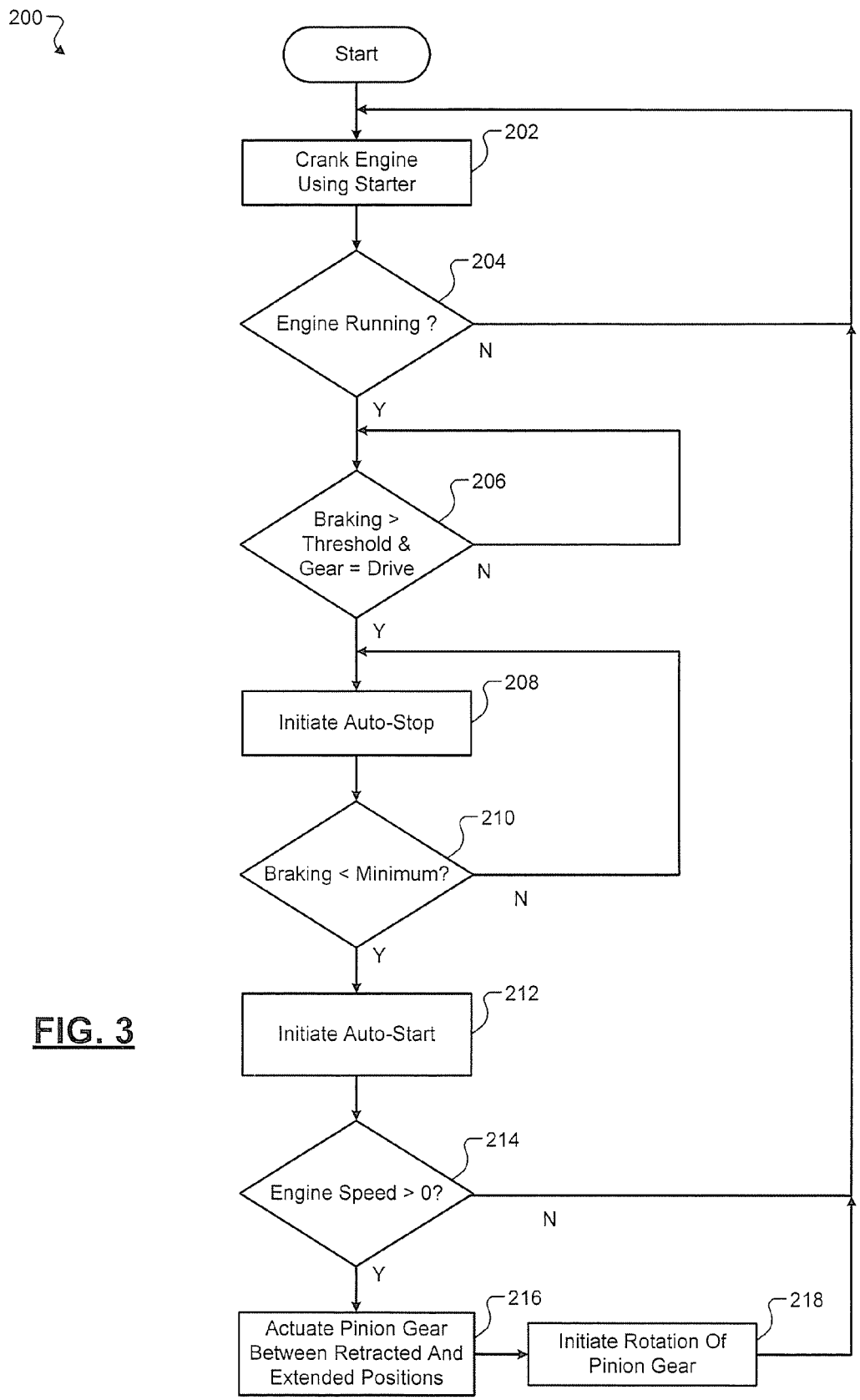
FIG. 3 is a flow diagram illustrating an exemplary method for controlling an engine system according to the present disclosure.

Referring now to FIG. 3, an exemplary method 200 for controlling the engine system 10 is shown. The method 200 may be implemented in one or more modules of the engine system 10, such as the control module 14, discussed above. For simplicity, the method 200 will be described with reference to the various components of the engine system 10.

At 202, control activates the starter 28 in a conventional continuous manner to crank and thereby start the engine 26. Control may activate the starter 28 in response to a request to start the engine 26. During activation of the starter 28, the starter 28 may engage the engine 26 and begin to supply torque to the engine 26 that increases engine speed. The control module 14 may continue to activate the starter 28 until the engine RPM increases above a predetermined engine run speed. The predetermined engine run speed may correspond to an engine RPM above which the engine 26 may continue to operate (i.e., run) on its own at startup without the continued assistance of the starter 28. The predetermined engine run speed may be a function of one or more engine operating conditions such as, but not limited to, engine temperature.

At 204, control determines whether the engine 26 is running. Control proceeds to 206 when the engine 26 is running. Otherwise, control returns to 202 as shown. Control may determine whether the engine 26 is running by comparing the engine RPM and the predetermined engine run speed. For example, control may determine the engine 26 is running when the engine RPM is greater than the predetermined engine run speed and the engine RPM is increasing.

At 206, control determines whether a brake pedal position indicated by the brake position sensor 32 is greater than a threshold position and whether the selected gear indicated by the gear selection sensor 36 is drive. When the brake pedal position is greater than the threshold position and the selected gear is drive, indicating conventional engine idle conditions are present, control proceeds to 208. At 208, control initiates an auto-stop to automatically stop the engine 26. Control proceeds to 210 when the auto-stop is in progress.

At 210, control determines whether the brake pedal position is less than a minimum position while the auto-stop is in progress. When the brake pedal position is less than the minimum position while the auto-stop is in progress, indicating acceleration is expected, control returns to 208. Otherwise, control proceeds to 212. At 212, control initiates an auto-start to automatically start the engine 26. Control proceeds to 214 when the auto-start is initiated.

At 214, control determines whether an engine speed is greater than zero when the auto-start is initiated. When the engine speed is greater than zero and the auto-start is initiated, control proceeds to 216 and 218. Otherwise, control returns to 202 as shown. At 216, control actuates the driving member 52 of the starter 28 between extended and retracted positions. Control may actuate the driving member 52 in an extended-retracted-extended sequence. Control may actuate the driving member 52 at an actuation frequency that is higher than a rotational frequency of the driven and driving members 50, 52 when engaged. At 218, control initiates rotation of the motor 46 of the starter 28. Control may perform 216 and 218 at the same time, and then may return to 202.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system, comprising:
   an auto-stop module that stops an engine when a brake pedal position is greater than a threshold position and a transmission is in a drive gear;
   an auto-start module that starts the engine when the brake pedal position is less than a minimum position and the engine stop is initiated; and
   a starter module that, when the engine start is initiated and an engine speed is greater than zero, engages a pinion gear of a starter with a ring gear of an engine by reciprocally actuating the pinion gear between a retracted position and an extended position N times, wherein N is an integer greater than two.

2. The control system of claim 1, wherein N is equal to three and the starter module initiates the reciprocal actuations when the pinion gear is in the retracted position.

3. The control system of claim 1, wherein the starter module engages the pinion gear when the engine speed is less than a maximum speed.

4. The control system of claim 1, wherein the starter module reciprocally actuates the pinion gear at an actuation frequency that is higher than a rotational frequency of at least one of the pinion gear and the ring gear.

5. The control system of claim 1, wherein the starter module initiates rotation of the pinion gear when initiating actuation of the pinion gear.

6. A control system, comprising:
   a gear rotation module that initiates rotation of a first gear; and
   a gear actuation module that engages the first gear with a second gear rotating at a different speed by reciprocally actuating the first gear between a retracted position and an extended position N times, wherein N is an integer greater than two.

7. The control system of claim 6, wherein N is equal to three and the gear actuation module initiates the reciprocal actuations when the first gear is in the retracted position.

8. The control system of claim 6, wherein the gear actuation module continues to reciprocally actuate the first gear between the retracted position and the extended position until the first gear engages with the second gear.

9. The control system of claim 6, wherein the gear actuation module reciprocally actuates the first gear at an actuation frequency that is higher than a rotational frequency of at least one of the first gear and the second gear.

10. The control system of claim 6, wherein the gear rotation module initiates rotation of the first gear when the gear actuation module initiates actuation of the first gear.

11. A method, comprising:
    initiating rotation of a first gear; and
    engaging the first gear with a second gear rotating at a different speed by reciprocally actuating the first gear between a retracted position and an extended position N times, wherein N is an integer greater than two.

12. The method of claim 11, further comprising initiating the reciprocal actuations when the first gear is in the retracted position, wherein N is equal to three.

13. The method of claim 11, further comprising continuing to reciprocally actuate the first gear between the retracted position and the extended position until the first gear engages with the second gear.

14. The method of claim 11, further comprising reciprocally actuating the first gear at an actuation frequency that is different than a rotational frequency of at least one of the first gear and the second gear.

15. The method of claim 14, wherein the actuation frequency of the first gear is higher than the rotational frequency of the at least one of the first gear and the second gear.

16. The method of claim 11, further comprising initiating rotation of the first gear when initiating actuation of the first gear.

17. The method of claim 11, further comprising generating a starter activation signal to initiate rotation and actuation of the first gear.

18. The method of claim 11, wherein the second gear is a driven gear of an engine and the first gear is a driving gear of a starter.

19. The method of claim 18, further comprising:
    stopping the engine when a brake pedal position is greater than a threshold position and a transmission is in a drive gear;
    starting the engine when the brake pedal position is less than a minimum position and the engine stop is initiated; and
    engaging the driving gear with the driven gear when the engine start is initiated and an engine speed is greater than zero.

20. The method of claim 19, further comprising engaging the driving gear with the driven gear when the engine speed is less than a maximum speed.

* * * * *